United States Patent
Barker et al.

(10) Patent No.: US 11,932,197 B2
(45) Date of Patent: Mar. 19, 2024

(54) DIGITAL KEY RELAY ATTACK PREVENTION SYSTEMS AND METHODS

(71) Applicant: Toyota Motor North America, Inc., Plano, TX (US)

(72) Inventors: Russell K. Barker, Winnie, TX (US); Nathan Humpal, San Antonio, TX (US)

(73) Assignees: TOYOTA MOTOR NORTH AMERICA, INC., Plano, TX (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/741,232

(22) Filed: May 10, 2022

(65) Prior Publication Data
US 2023/0365101 A1 Nov. 16, 2023

(51) Int. Cl.
*B60R 25/20* (2013.01)
*B60R 25/24* (2013.01)
*G07C 9/00* (2020.01)

(52) U.S. Cl.
CPC ........ *B60R 25/2072* (2013.01); *B60R 25/246* (2013.01); *G07C 9/00309* (2013.01); *B60R 2325/101* (2013.01); *G07C 2009/00388* (2013.01); *G07C 2009/00555* (2013.01);
(Continued)

(58) Field of Classification Search
None
See application file for complete search history.

(56) References Cited

U.S. PATENT DOCUMENTS 9,637,050 B2 * 5/2017 Miura ...................... G08G 1/04
9,783,161 B2 * 10/2017 Lee ......................... B60R 25/248
(Continued)

FOREIGN PATENT DOCUMENTS

KR        20200003502 A        1/2020

OTHER PUBLICATIONS

Aureilien Francillon et al., "Relay Attacks on Passive Keyless Entry and Start Systems in Modern Cars," IACR Cryptology, 2010, 15 pages.
(Continued)

*Primary Examiner* — Carlos Garcia
(74) *Attorney, Agent, or Firm* — HAYNES AND BOONE, LLP (57) ABSTRACT

Systems and methods for preventing digital key relay attacks are provided. A method includes determining a threshold response time for a wireless communications device to process a challenge. Determining the threshold response time may include determining a benchmark response time for the wireless communications device to respond to the challenge based on one or more conditions of the wireless communications device, and setting the threshold response time to the benchmark response time. The method further includes sending the challenge to the wireless communications device. The method further includes receiving a response to the challenge from the wireless communications device within a response time. The method further includes authenticating the wireless communications device based on the response time being less than the threshold response time. Associated systems are also provided.

16 Claims, 7 Drawing Sheets

(52) U.S. Cl.
CPC .............. *G07C 2009/00769* (2013.01); *G07C 2209/63* (2013.01)

(56) References Cited

U.S. PATENT DOCUMENTS

| | | |
|---|---|---|
| 11,254,288 B1 | 2/2022 | Elangovan et al. |
| 2017/0129457 A1* | 5/2017 | Lee .................. B60R 25/248 |

OTHER PUBLICATIONS

Samuel Woo et al., "A Practical Wireless Attack on the Connected Car and Security Protocol for In-Vehicle CAN," IEEE Transactions on Intelligent Transportation Systems, vol. 16, No. 2, Apr. 2015, 993-1006.

Chan-Kyu Han et al., "Evaluation of Authentication Signaling Loads in 3GPP LTE/SAE Networks," 2009 IEEE 34th Conference on Local Computer Networks, 2009, 37-44.

Wonsuk Choi et al., "Sound-Proximity: 2-Factor Authentication against Relay Attack on Passive Keyless Entry and Start System," Journal of Advanced Transportation, vol. 2108, 2017, 1-13.

Yasser Shoukry et al., "PyCRA: Physical Challenge-Response Authentication For Active Sensors Under Spoofing Attacks," Association for Computing Machinery, 2015, 12 pages.

Sung-Woong Jo et al., "Response Time Constrained CPU Frequency and Priority Control Scheme for Improved Power Efficiency in Smartphones," IEICE Trans. Inf. & Syst., vol. E100-D, No. 1, Jan. 2017, 65-78.

Jing Li et al, "User Context Detection for Relay Attack Resistance in Passive Keyless Entry and Start System," Sensors 2020, 20, 4446, doi: 10.3390/s20164446, 1-19.

Gyu-Ho Kim et al., "Vehicle Relay Attack Avoidance Methods using RF Signal Strength," Communications and Network, May 2013, 573-577.

\* cited by examiner

DIGITAL KEY RELAY ATTACK PREVENTION SYSTEMS AND METHODS

TECHNICAL FIELD

The present disclosure relates generally to vehicle cybersecurity, and, more particularly, to systems and methods for preventing a relay attack against a wireless digital key.

BACKGROUND

Digital key technology provides a user the ability to perform one or more operations of a vehicle (e.g., unlock/lock, start/stop, etc.) via a smartphone application. For example, an application may receive an encryption key and authenticate the key by bringing the smartphone within proximity of a vehicle. Once inside the vehicle, the user can start/stop the vehicle (e.g., via a push start button), such as via the same or similar authentication process. These systems and methods can be subject to relay attacks, such that the relay can achieve the advantage of authentication without the smartphone in proximity of the vehicle.

Therefore, a need exists in the art for systems and methods that address the above deficiencies, or at least offers an improvement, in the art. For example, a need exists for systems and methods that prevent or limit a relay attack against a wireless digital key.

BRIEF SUMMARY

Embodiments of the present disclosure are directed to systems and methods for limiting digital key relay attacks. For example, systems and methods are provided that determine a maximum acceptable time for a wireless communications device (e.g., key-fob, smartphone, etc.) to respond to a message (e.g., a challenge or challenge field). When a response is received, if the elapsed time is greater than the maximum acceptable response time, then the message/wireless communications device is unauthenticated. The maximum acceptable response time may be determined based on one or more unique conditions of the wireless communications device (e.g., processing power/loading, etc.) and/or factors existing between the wireless communications device and a vehicle (e.g., distance, network interference, etc.).

Various embodiments of the present disclosure include a method. The method includes determining, by an authentication system of a vehicle, a threshold response time for a wireless communications device to process a challenge field. The method further includes sending, by the authentication system, the challenge field to the wireless communications device. The method further includes receiving, by the authentication system, a response to the challenge field from the wireless communications device within a response time. The method further includes authenticating, by the authentication system, the wireless communications device based on the response time being less than the threshold response time.

Various embodiments of the present disclosure include a method. The method includes determining, by an authentication system, a benchmark response time for a wireless communications device to respond to a challenge based on one or more conditions of the wireless communications device. The method further includes setting a threshold response time to the benchmark response time. The method further includes sending, by the authentication system, a message to the wireless communications device, the message including the challenge. The method further includes receiving, by the authentication system, a response to the message from the wireless communications device within a response time. The method further includes authenticating, by the authentication system, the wireless communications device based on the response time being less than the threshold response time.

Various embodiments of the present disclosure include a system. The system includes a logic device configured to perform operations. The operations include determine a threshold response time for a wireless communications device to process a challenge field, send the challenge field to the wireless communications device, receive a response to the challenge field from the wireless communications device within a response time, and authenticate the wireless communications device based on the response time being less than the threshold response time.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

Embodiments of the present disclosure are directed to digital key relay attack prevention. Authentication between a wireless communications device and a vehicle may occur when the wireless communications device is proximate the vehicle. A relay attack is present when attackers utilize one or more transmitters to receive commands from a wireless communications device (e.g., smartphone, key-fob, etc.) and transmit the commands to another transmitter such that both the wireless communications device and the vehicle believe that they are proximate. To limit or prevent relay attacks, when a response is received at the vehicle, if the elapsed time is greater than a maximum threshold response time, the message from the wireless communications device is unauthenticated.

In embodiments, the maximum threshold response time may be predetermined, based on average response times, or based on a benchmark time determined from a series of challenges and response transmissions under varying processing load conditions. For example, the benchmark time may be determined based on a series of tests run on a wireless communications device to determine an acceptable response time that is unique to the wireless communications device, such as based on the device's unique processing components/power, performance, average CPU loading, or the like. This may be done to "benchmark" the wireless communications device to a standard unique to the device itself, rather than to a preset or arbitrary time. In embodiments, the maximum threshold response time may be based on other factors.

Figure 1:
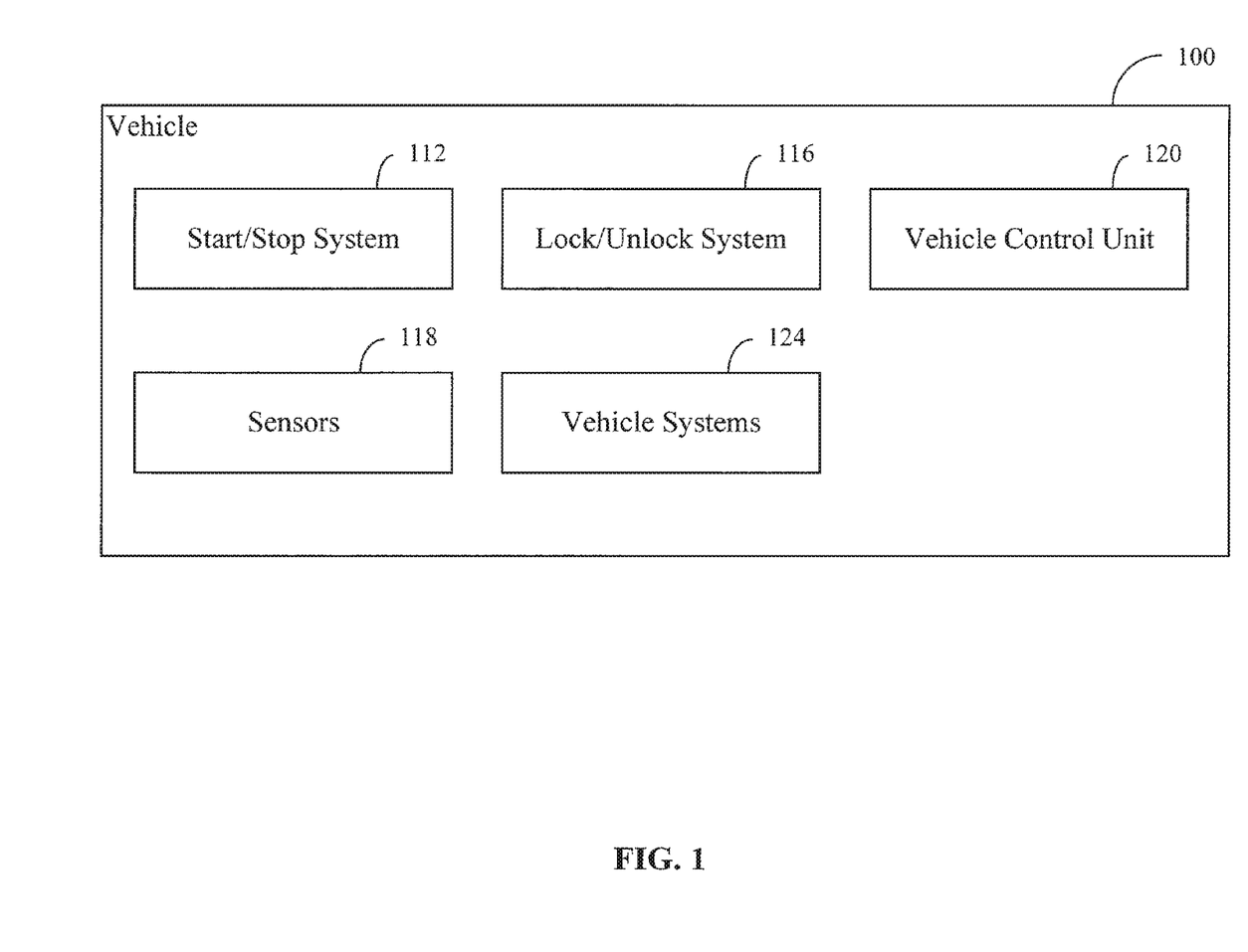
FIG. 1 is a diagram of various systems of a vehicle, according to one or more embodiments of the disclosure.

FIG. 1 is a diagram of various systems of a vehicle 100, according to one or more embodiments of the disclosure. Referring to FIG. 1, vehicle 100 may include a start/stop system 112, a lock/unlock system 116, one or more sensors 118, a vehicle control unit 120, and other vehicle systems 124. Vehicle 100 may be any type of vehicle, including, for example, a truck, a sport utility vehicle, a crossover utility vehicle, a van, a multipurpose vehicle, a sedan, a hatchback, a wagon, a coupe, a sports car, a convertible, or any other type of vehicle.

Start/stop system 112 may be configured to start and/or stop (i.e., shut down) an engine (e.g., an internal combustion engine) of vehicle 100. Start/stop system 112 may include a push button allowing the driver to start and/or stop the engine. For example, a driver may start vehicle 100 via a push start button and conversely stop vehicle 100 via push start button once driving is complete or when engine shut down is desired. In embodiments, starting or stopping of the vehicle's engine may be based on certain criteria being met, such as a detected position of driver (e.g., properly positioned within vehicle 100, etc.) and/or condition of vehicle 100 (e.g., vehicle 100 is in park or neutral, etc.). If such conditions are not met, the push start button may not function (e.g., via an override function provided by vehicle control unit 120). In embodiments, start/stop system 112 may be based on a location of a wireless communications device 130 (e.g., key-fob, smartphone, etc.) in relation to vehicle 100, as detailed below. For instance, start/stop system 112 may be activated only when wireless communications device 130 is detected within a threshold distance from vehicle 100. In embodiments, start/stop system 112 may be activated via an application running on wireless communications device 130.

Lock/unlock system 116 may be configured to lock and/or unlock vehicle 100. In embodiments, lock/unlock system 116 may be based on a detected position of wireless communications device 130 in proximity to vehicle 100. For example, lock/unlock system 116 may unlock vehicle 100 (e.g., automatically) when wireless communications device 130 is detected as proximate and/or approaching vehicle 100. Conversely, lock/unlock system 116 may lock vehicle 100 (e.g., automatically) when wireless communications device 130 is detected as leaving a proximity zone around vehicle 100. In embodiments, lock/unlock system 116 may be activated via an application running on wireless communications device 130.

Sensors 118 may include any number and type of sensor supporting operation of vehicle 100 or any other operations described herein (e.g., authentication operations). For example, sensors 118 may include an accelerometer, an inertial measurement unit (IMU), a proximity sensor, a camera, or any combination thereof.

Vehicle control unit 120 may be any logic device, controller, processor, module, circuitry, or device configured to perform one or more operations. Vehicle control unit 120, which may be referred to as a logic device, may be implemented as any appropriate controller (e.g., processing device, microcontroller, electronic control unit, processor, application specific integrated circuit (ASIC), field programmable gate array (FPGA), memory storage device, memory reader, or other device or combinations of devices) that may be adapted to execute, store, and/or receive appropriate instructions, such as software instructions for controlling various operations of vehicle 100, such as start/stop system 112, lock/unlock system 116, vehicle systems 124, and/or other elements of vehicle 100, for example. Such software instructions may also implement methods for processing sensor signals or data, determining sensor information, providing user feedback (e.g., through a user interface), querying devices for operational parameters, selecting operational parameters for devices, or performing any of the various operations described herein (e.g., operations performed by logic devices of various devices of vehicle 100).

Vehicle control unit 120 may be communicatively connected to start/stop system 112, lock/unlock system 116, and vehicle systems 124. Vehicle control unit 120 may be configured to receive data from at least one sensor of vehicle 100. Additionally, or alternatively, vehicle control unit 120 may be configured to transmit data to and receive data from wireless communications device 130. Depending on the application, vehicle control unit 120 may receive and transmit data over wired or wireless communication.

Based on data received, vehicle control unit 120 may be configured to authenticate wireless communications device 130. For instance, vehicle control unit 120 may include an authentication system or subsystem 140 configured to provide authentication of wireless communications device 130 via encryption when wireless communications device 130 is proximate vehicle 100. Authentication system 140 may provide authentication via encryption when wireless communications device 130 is proximate vehicle 100, as described below. For example, authentication system 140 may send a message including a challenge field to wireless communications device 130. When wireless communications device 130 can respond to the message/challenge field with a correct response, wireless communications device 130 is authenticated by authentication system 140.

With continued reference to FIG. 1, vehicle 100 may include other components or systems. For example, vehicle systems 124 may include a propulsion system (e.g., engine and drivetrain), a suspension system, a GPS system, a vehicle dynamics system, sensors, interfaces, controllers, control systems, an audio system, a display system, a communications system, and/or a user interface system, among others, of vehicle 100.

Figure 2:
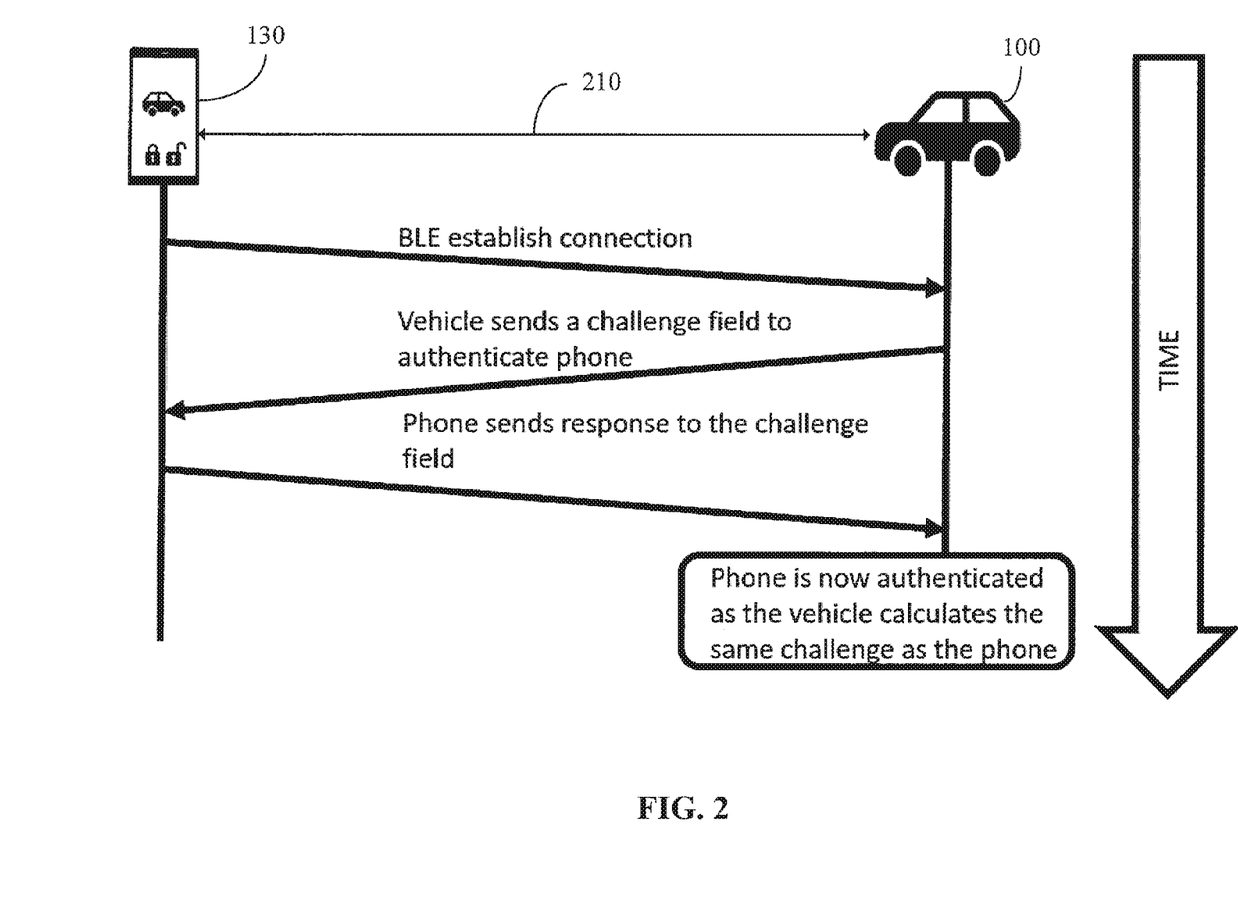
FIG. 2 is a diagram of a digital key use case, according to one or more embodiments of the disclosure.

FIG. 2 is a diagram of a digital key use case, according to one or more embodiments of the disclosure. Referring to FIG. 2, a wireless digital key can be configured to allow wireless communications device 130 to control an operation of vehicle 100 in response to a distance 200 between the wireless communications device 130 and vehicle 100 being within a threshold distance. For example, the wireless communications device 130 may unlock/lock vehicle 100, control a start/stop functionality of vehicle 100, open a door, trunk, or hatch of vehicle 100, or control other operations of vehicle 100 when wireless communications device 130 is in proximity to (e.g., within threshold distance from) vehicle 100. The threshold distance may vary based on the operation of vehicle 100 to be controlled by wireless communications device 130 (e.g., within vehicle 100 to enable start/stop operation of vehicle 100, within a few feet to unlock/lock vehicle 100, etc.). The wireless communications device 130 may be a smartphone, a smartwatch, a tablet, a key-fob, or other device operable to perform the operations described herein.

As shown, wireless communications device 130 may establish a wireless connection with vehicle 100 (e.g., via Bluetooth low energy (BLE), WiFi, or other connection means). Based on the wireless connection being established between wireless communications device 130 and vehicle 100 and/or receipt of a command from wireless communications device 130 via wireless connection, vehicle 100 may send a challenge or challenge field to wireless communications device 130. Wireless communications device 130 may then send a response to the challenge field. The wireless communications device 130 can then be authenticated by vehicle 100 based on a correct response to the challenge field (e.g., vehicle 100 calculates the same challenge as wireless communications device 130). Based on the wireless communication device being authenticated, a command from wireless communication device may be executed by vehicle 100.

Figure 3:
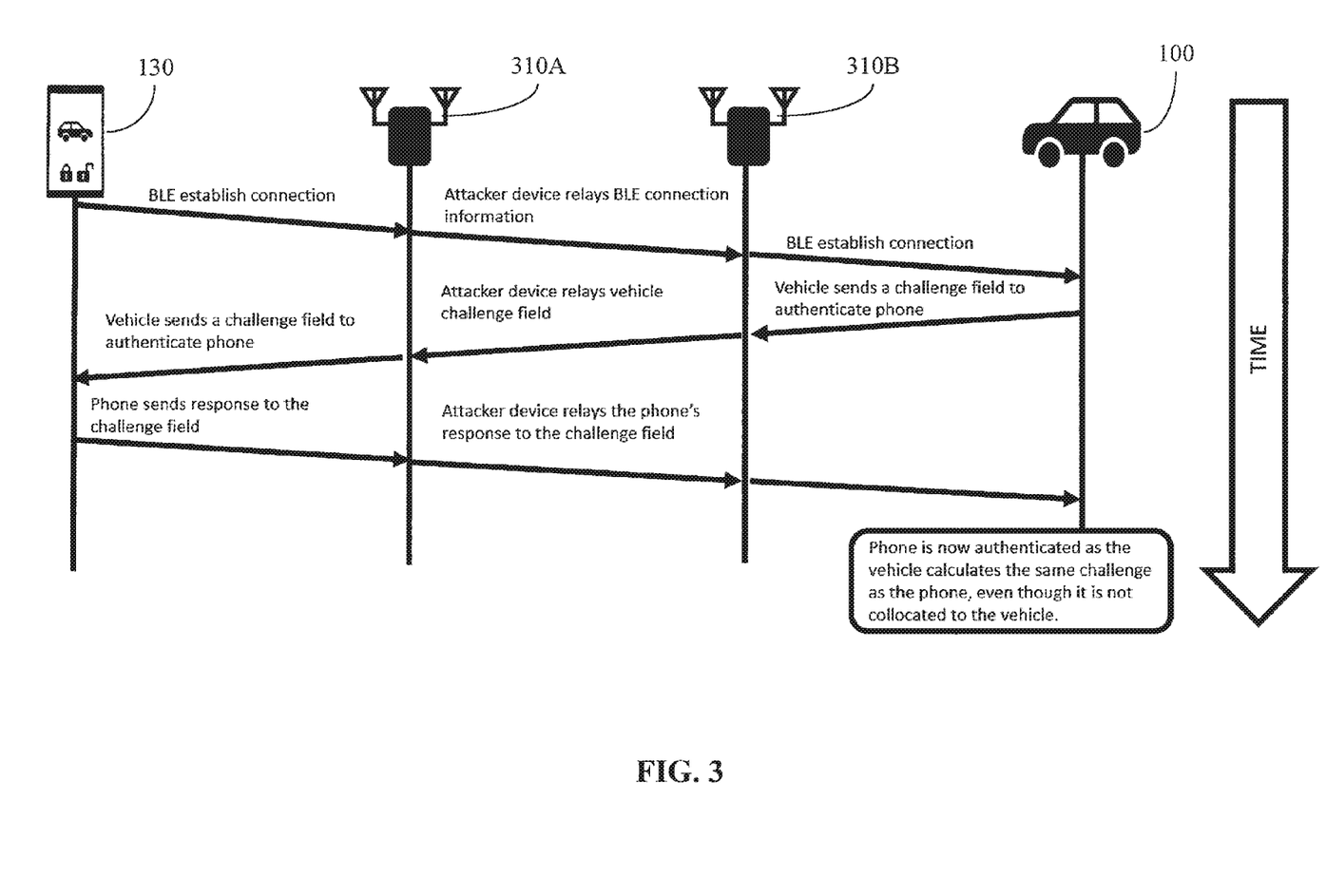
FIG. 3 is a diagram of a digital key relay attack use case, according to one or more embodiments of the disclosure.

FIG. 3 is a diagram of a digital key relay attack use case, according to one or more embodiments of the disclosure. In a relay attack, one or more relay devices 310 (e.g., a first relay device 310A and a second relay device 310B) can relay information between wireless communications device 130 and vehicle 100. For instance, relay device(s) 310 may relay connection information between devices and/or the challenge field from vehicle 100 to wireless communications device 130. Relay device(s) 310 may also relay the correct response to the challenge field so that the relay can achieve the advantage of authentication even though wireless communications device 130 is not within the threshold distance from vehicle 100.

In the example of FIG. 3, first relay device 310A is near wireless communications device 130, and second relay device 310B is near vehicle 100. First and second relay devices 310A, 310B may send unaltered messages to/from wireless communications device 130 and/or vehicle 100. In such relay attack scenarios, wireless communications device 130 may determine that vehicle 100 is proximate, and vehicle 100 may determine that wireless communications device 130 is proximate. As shown, first and second relay devices 310A, 310B may communicate over a distance, thereby allowing for commands from wireless communications device 130 to be executed by vehicle 100 when wireless communications device 130 is not proximate vehicle 100.

Figure 4:
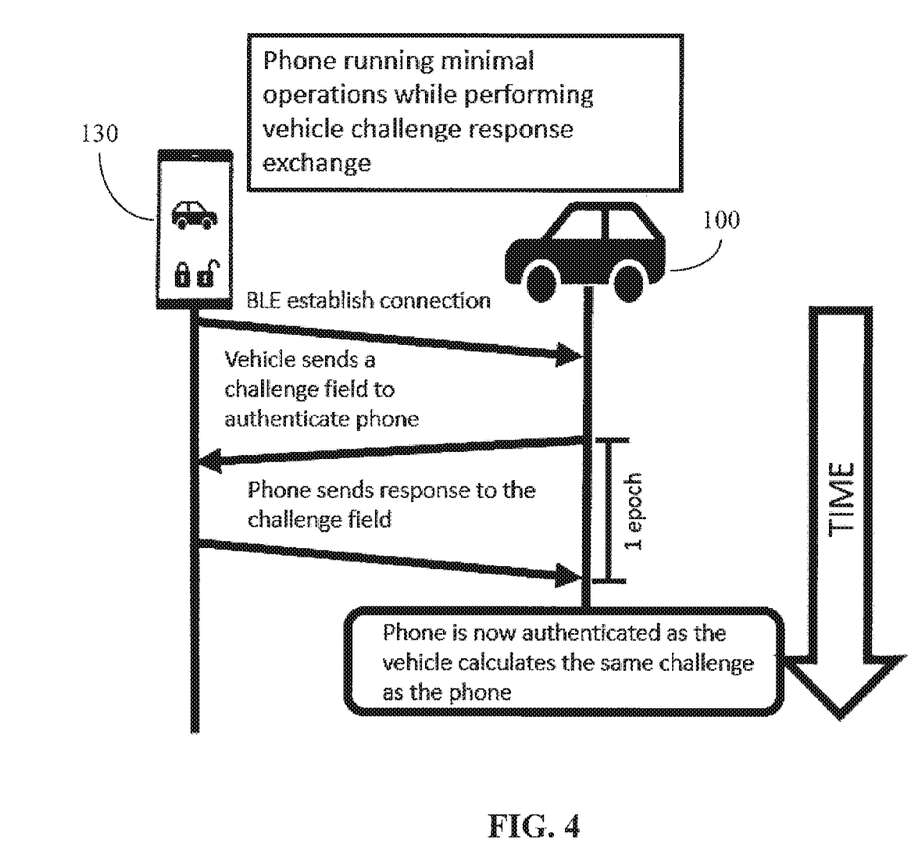
FIG. 4 is a diagram of a benchmark digital key use case with a wireless communications device running minimal CPU operations, according to one or more embodiments of the disclosure.
Figure 5:
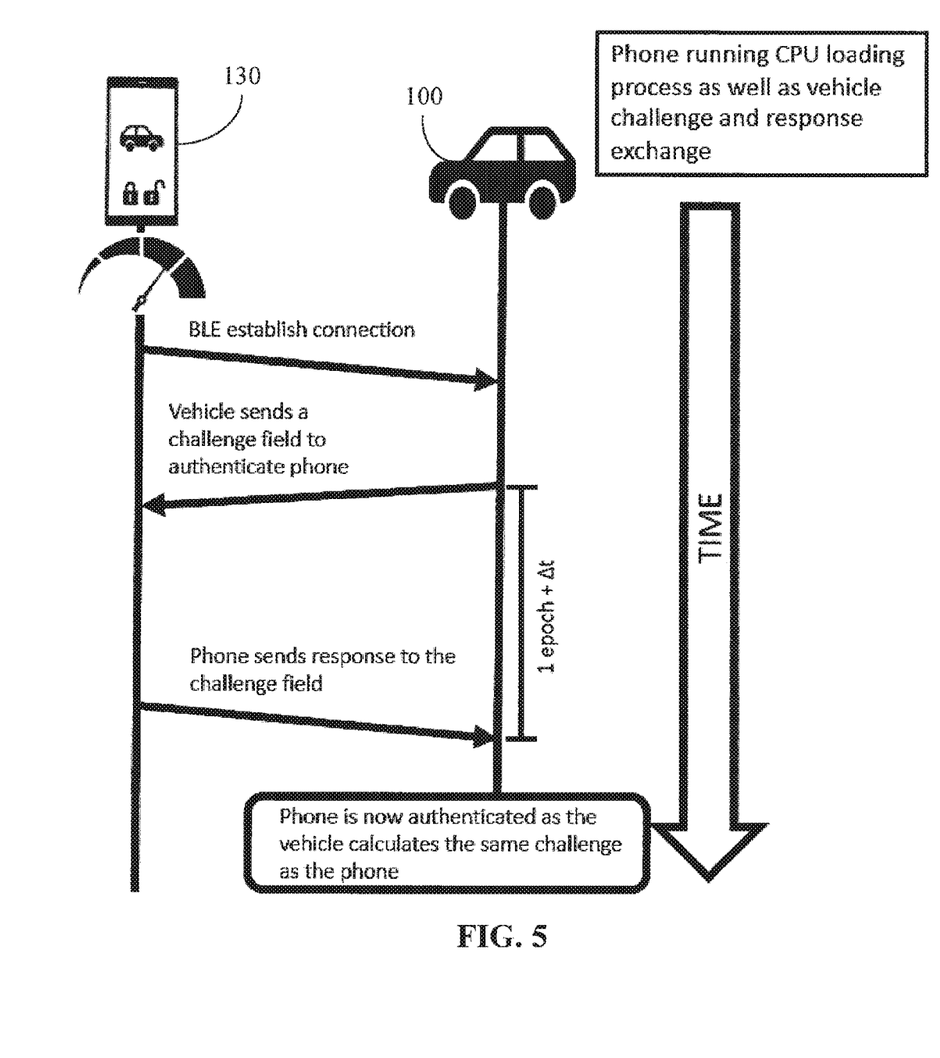
FIG. 5 is a diagram of a benchmark digital key use case with a wireless communications device running CPU loading processes, according to one more embodiments of the disclosure.

FIGS. 4-5 illustrate digital use cases that overcome a relay attack, according to one or more embodiments of the disclosure. Referring to FIGS. 4-5, authentication system 140 may utilize a time-based approach to determine that wireless communications device 130 is proximate vehicle 100. For example, authentication system 140 may be configured to limit a relay attack by limiting authentication if a time to respond to the challenge field is greater than a threshold response time. When vehicle 100 receives, from wireless communications device 130, a response to the challenge field, if the amount of time of the response is greater than the threshold response time, wireless communications device 130 is not authenticated. Conversely, if the amount of time of the response is less than or equal to the threshold response time, wireless communications device 130 is authenticated.

The threshold response time may be a function of processing power/utilization of wireless communications device 130. For example, FIG. 4 is a diagram of a benchmark digital key use case with wireless communications device 130 running minimal CPU operations, according to one or more embodiments of the disclosure. In such embodiments, the threshold response time may be the amount of time ("1 epoch") wireless communications device 130 may need to respond to the challenge/challenge field when the processor/processing system of wireless communications device 130 is running at a high processing level. If the response time of wireless communications device 130 is greater than such threshold response time (i.e., greater than "1 epoch"), wireless communications device 130 is not authenticated.

FIG. 5 is a diagram of a benchmark digital key use case with wireless communications device 130 running one or more CPU loading processes, according to one more embodiments of the disclosure. As illustrated in FIG. 5, the response time of wireless communications device 130 may vary based on a processing load. For example, the response time may increase ("1 epoch+$\Delta t$") when the processor/processing system of wireless communications device 130 is running one or more CPU loading processes in addition to the vehicle challenge and response exchange. For instance, the response time may be a function of one or more of a processing power of wireless communications device 130 or a count of the processes being run on wireless communications device 130.

In such embodiments, the threshold response time may be benchmarked to the processing load of wireless communications device 130. For example, authentication system 140 may be configured to determine a benchmark time to respond for wireless communications device 130 based on a series of receptions of challenges and transmissions of responses under varying load conditions and to set the threshold response time based on the benchmark time to respond. In embodiments, wireless communications device 130 may send processor-load data to vehicle 100. The processor-load data may be sent when an initial connection is established between wireless communications device 130 and vehicle 100, or thereafter. The processor-load data may include the load of the processor/processing system of wireless communications device 130, such as an average processor-load over a period. The maximum amount of time for wireless communications device 130 to respond to the challenge field (i.e., the threshold response time) may be determined using the processor-load data. In these and other embodiments, wireless communications device 130 may be benchmarked to a response standard unique to the device itself, rather than to an arbitrary time.

Based on the processor-load data received by vehicle 100, a message/command may be sent to wireless communications device 130 instructing one or more processes to be ended. The processes may be explicitly named, or the processes may be one or more high-capacity processes. In embodiments, vehicle 100 (or another device of authentication system 140) may determine which are the least important processes running on wireless communications device 130 and recommend the ending of the least important processes. The least important processes may include, without limitation, a camera process, a navigation application, or the like. In embodiments, vehicle 100 (or another device of authentication system 140) may send a message/command instructing wireless communications device 130 to end one or more processes named in the message/command.

The threshold response time may be determined in other configurations. For instance, the threshold response time may be determined prior to an authentication attempt/request. In embodiments, an average response time of several devices that are similar to wireless communications device 130 may be used as the threshold response time. In embodiments, the threshold response time may be determined by vehicle 100 or another device external to vehicle 100, such as a service or a mobile device that may or may not be associated with vehicle 100.

In embodiments, a distance between wireless communications device 130 and vehicle 100 may be determined. The threshold response time may be based on the distance between wireless communications device 130 and vehicle 100. For example, the further the distance, the greater amount of time is needed for vehicle 100 to receive from wireless communications device 130 a response from a sent message/challenge field, and vice versa.

In embodiments, an interference between wireless communications device 130 and vehicle 100 may be determined. The threshold response time may be based on the interference between wireless communications device 130 and vehicle 100. For instance, the greater the interference, the greater amount of time is needed for vehicle 100 to receive from wireless communications device 130 a response from a sent message/challenge field, and vice versa. The interference may be caused by physical objects between vehicle 100 and wireless communications device 130. Additionally, or alternatively, the interference may be caused by network congestion that impedes wireless communication.

In embodiments, if the time to receive a response from wireless communications device 130 is greater than the threshold response time, authentication may be repeated one or more times. In such embodiments, an average number of authentication successes and/or failures may be determined, wherein the success or failure of the authentication is based on the average number.

Figure 6:
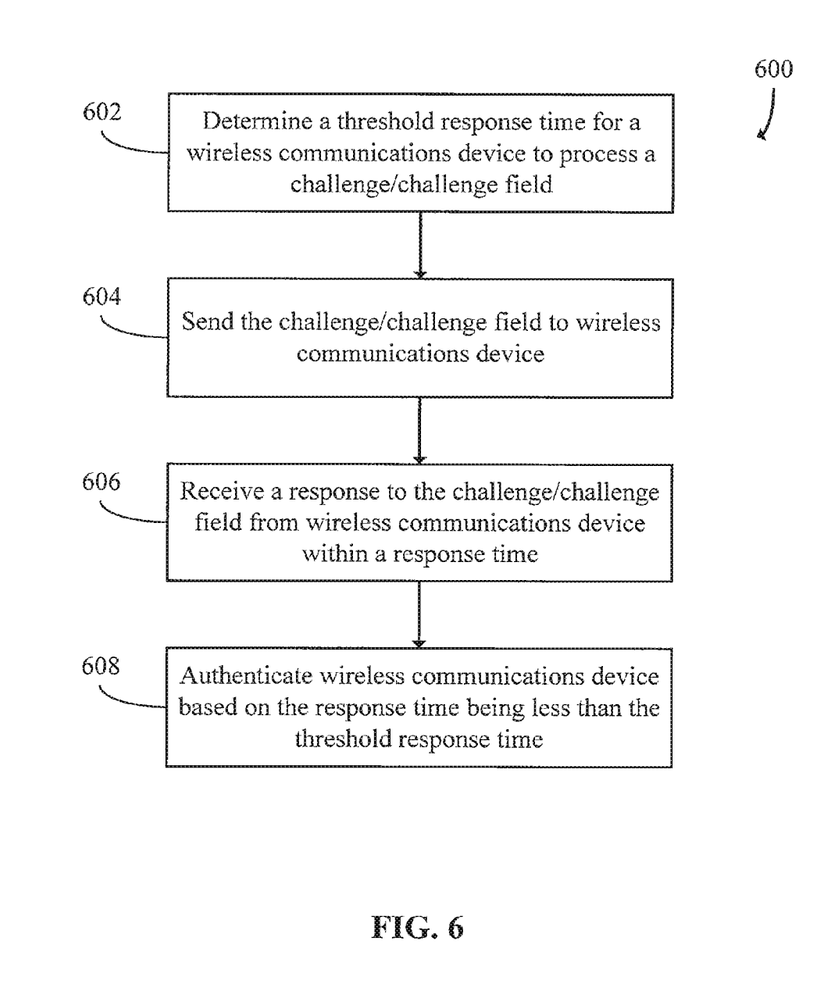
FIG. 6 is a flowchart of a method of limiting relay attacks of a digital key, according to one or more embodiments of the disclosure.

FIG. 6 is a flowchart of a method 600 of limiting relay attacks of a digital key, according to one or more embodiments of the disclosure. For explanatory purposes, method 600 is described with reference to FIGS. 1-4. Note that one or more operations in FIG. 6 may be combined, omitted, and/or performed in a different order as desired. According to various embodiments, method 600 may be performed by a logic device, such as vehicle control unit 120, authentication system 140, or other module of vehicle 100, or a combination of the aforementioned logic devices, which may be communicatively coupled to execute the operations of method 600.

In block 602, method 600 includes determining (e.g., by authentication system 140 of vehicle 100) a threshold response time for wireless communications device 130 to process a challenge or challenge field. In embodiments, block 602 includes determining (e.g., by authentication system 140) a benchmark response time for wireless communications device 130 to respond to the challenge field based on one or more conditions of wireless communications device 130, and setting the threshold response time to the benchmark response time. In embodiments, determining the benchmark response time may be based on a series of receptions of challenges and transmissions of responses under varying load conditions of a processor of wireless communications device 130. In embodiments, determining the benchmark response time may be based on at least one of a distance or an amount of interference between wireless communications device 130 and vehicle 100.

In embodiments, block 602 includes receiving (e.g., by authentication system 140) processor-load data from wireless communications system, and determining a maximum amount of time for wireless communications device 130 to respond to the challenge field based on the processor-load data. The processor-load data may be received by authentication system 140 when an initial connection is established between wireless communications device 130 and vehicle 100 (e.g., authentication system 140). In embodiments, a command may be sent (e.g., by authentication system 140) instructing wireless communications device 130 to end one or more processes running on wireless communications device 130.

In block 604, method 600 includes sending (e.g., by authentication system 140) the challenge field to wireless communications device 130. For example, a message including the challenge field may be sent to wireless communications device 130 over a wireless connection, such as Bluetooth low energy (BLE), WiFi, a network or the like. Wireless communications device 130 may then process the message/challenge field and provide a response for authentication purposes, as described herein.

In block 606, method 600 includes receiving (e.g., by authentication system 140) a response to the challenge field from wireless communications device 130 within a response time. For example, after processing the message/challenge field, wireless communications device 130 may send a response to vehicle 100/authentication system 140. The time between sending the challenge field and receiving the response may be considered the response time. As noted above, the response time may vary based on distance, an amount of network interference, and/or a processing power/load of wireless communications device 130, among others.

In block 608, method 600 includes authenticating (e.g., by authentication system 140) wireless communications device 130 based on the response time being less than the threshold response time. For example, the response time may be compared to the threshold response time. If the response time is less than the threshold response time, wireless communications device 130 may be authenticated. If the response time is greater than the threshold response time, wireless communications device 130 may be unauthenticated (e.g., to limit or prevent a digital key relay attack).

Figure 7:
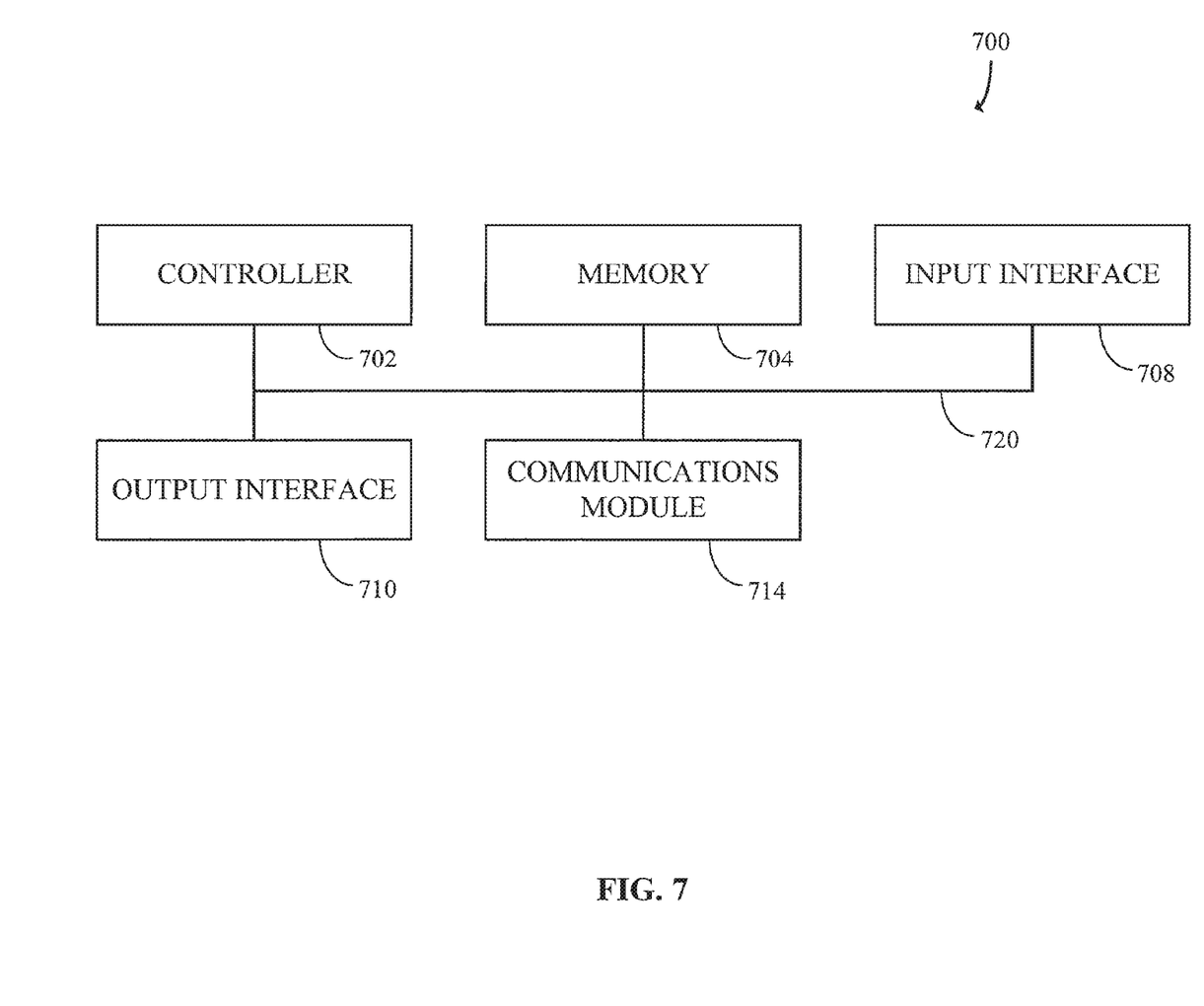
FIG. 7 is a diagram illustrating an example computing or processing system, according to one or more embodiments of the disclosure.

FIG. 7 is a diagram illustrating an example computing or processing system 700 in which embodiments of the present disclosure may be implemented, according to one or more embodiments of the disclosure. For example, start/stop system 112, lock/unlock system 116, authentication system 140, wireless communications device 130, and/or vehicle control unit 120, described above, may be implemented using system 700. In some embodiments, method 600 of FIG. 6 described above may be implemented using system 700. System 700 can be or include a computer, phone, PDA, tablet, server, controller, or any other type of electronic device. Such an electronic device includes various types of computer readable media and interfaces for various other types of computer readable media. As shown in FIG. 7, system 700 includes a controller 702, a memory 704, an input interface 708, an output interface 710, and a communications module 714.

Controller 702, according to various embodiments, includes one or more of a processor, a microprocessor, a central processing unit (CPU), an electronic control unit, a graphics processing unit (GPU), a single-core processor, a multi-core processor, a microcontroller, a programmable logic device (PLD) (e.g., field programmable gate array (FPGA)), an application specific integrated circuit (ASIC), a digital signal processing (DSP) device, or other logic device that may be configured, by hardwiring, executing software instructions, or a combination of both, to perform various operations discussed herein for embodiments of the disclosure. Controller 702 may be configured to interface and communicate with the various other components of system 700 to perform such operations. For example, controller 702 may be configured to receive and process map, position, distraction, facial monitoring, and vehicle dynamics data, among others, received from a network and/or one or more sensors, store the data in memory 704, and/or retrieve stored data from memory 704.

Controller 702 may include combinations of hardware and software processing functionality and may be provided with/in and/or communicatively attached to other components to execute appropriate instructions, such as software instructions and/or processing parameters stored in memory 704. In various embodiments, controller 702 may be configured to execute software instructions stored in memory 704 to perform various methods, processes, or operations in the manner described herein.

Memory 704 includes, in one embodiment, one or more memory devices configured to store data and information, including magnetic flux data and position information. The memory 704 may include one or more various types of memory devices including volatile and non-volatile memory devices, such as random-access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, controller 702 may be configured to execute software instructions stored in memory 704 to perform method 600 and process steps and/or operations. Controller 702 may be configured to store data in memory 704.

Input interface 708 includes, in one embodiment, a user input and/or an interface device, such as one or more controls, knobs, buttons, slide bars, keyboards, sensors, cameras, and/or other devices, that are adapted to generate an input control signal. Controller 702 may be configured to sense the input control signals from input interface 708 and respond to any sensed input control signals received therefrom. Controller 702 may be configured to interpret such an input control signal as a value, as generally understood by one skilled in the art. In one embodiment, input interface 708 may include a control unit (e.g., a wired or wireless handheld control unit) having push buttons adapted to interface with a user and receive user input control values. In one implementation, the push buttons of the control unit may be used to control various system functions.

Output interface 710 may enable, for example, the output of data or other information. Output interface 710 may include, for example, one or more display devices, such as monitors or other visual displays (e.g., light emitting diode (LED) displays, liquid crystal displays (LCDs), head-up displays (HUDs), or other types of displays). Some implementations include devices such as a touchscreen that function as both input and output components. Controller 702 may be configured to render data and information on output interface 710. For example, controller 702 may be configured to render data on output interface 710, such as data stored in memory 704.

In some embodiments, various components of system 700 may be distributed and in communication with one another over a network. In this regard, communications module 714 may be configured to facilitate wired and/or wireless communication among various system components over the network. Such a network may include, for example, a Bluetooth low energy network, a local area network ("LAN"), such as an Intranet, or a wide area network ("WAN"), such as the Internet.

In embodiments, various components of system 700 may be communicatively connected via a system communications bus 720. Bus 720 collectively represents all system, peripheral, and chipset buses that communicatively connect the numerous devices of system 700. For instance, bus 720 may communicatively connect controller 702, memory 704, input interface 708, output interface 710, communications module 714, start/stop system 112, lock/unlock system 116, and authentication system 140, or any combination thereof, together.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

While certain exemplary embodiments of the invention have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art. The intention is to cover all modifications, equivalents and alternatives falling within the spirit and scope of the disclosure as defined by the claims.

For example, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments. In addition, while different steps, processes, and procedures are described as appearing as distinct acts, one or more of the steps, one or more of the processes, and/or one or more of the procedures may also be performed in different orders, simultaneously, and/or sequentially. In some embodiments, the steps, processes, and/or procedures may be merged into one or more steps, processes, and/or procedures. In some embodiments, one or more of the operational steps in each embodiment may be omitted.

What is claimed is:

1. A method comprising:
   determining, by an authentication system of a vehicle, a threshold response time for a wireless communications device to process a challenge field;
   sending, by the authentication system, the challenge field to the wireless communications device;
   receiving, by the authentication system, a response to the challenge field from the wireless communications device within a response time; and
   authenticating, by the authentication system, the wireless communications device based on the response time being less than the threshold response time,
   wherein determining the threshold response time comprises:
      receiving, by the authentication system, processor-load data from the wireless communications device; and
      determining a maximum amount of time for the wireless communications device to respond to the challenge field based on the processor-load data.

2. A method comprising:
   determining, by an authentication system of a vehicle, a threshold response time for a wireless communications device to process a challenge field;
   sending, by the authentication system, the challenge field to the wireless communications device;
   receiving, by the authentication system, a response to the challenge field from the wireless communications device within a response time; and
   authenticating, by the authentication system, the wireless communications device based on the response time being less than the threshold response time;
   wherein determining the threshold response time comprises:
      determining, by the authentication system, a benchmark response time for the wireless communications device to respond to the challenge field based on one or more conditions of the wireless communications device; and
      setting the threshold response time to the benchmark response time; and
   wherein determining the benchmark response time is based on a series of receptions of challenges and transmissions of responses under varying load conditions of a processor of the wireless communications device.

3. A method comprising:
   determining, by an authentication system of a vehicle, a threshold response time for a wireless communications device to process a challenge field;
   sending, by the authentication system, the challenge field to the wireless communications device;
   receiving, by the authentication system, a response to the challenge field from the wireless communications device within a response time; and
   authenticating, by the authentication system, the wireless communications device based on the response time being less than the threshold response time;
   wherein determining the threshold response time comprises:
      determining, by the authentication system, a benchmark response time for the wireless communications device to respond to the challenge field based on one or more conditions of the wireless communications device; and
      setting the threshold response time to the benchmark response time; and
   wherein determining the benchmark response time is based on an amount of interference between the wireless communications device and the vehicle.

4. The method of claim 1, wherein the processor-load data is received by the authentication system when an initial connection is established between the wireless communications device and the authentication system.

5. The method of claim 1, further comprising sending, by the authentication system, a command instructing the wireless communications device to end one or more processes running on the wireless communications device.

6. A method comprising:
   determining, by an authentication system, a benchmark response time for a wireless communications device to respond to a challenge based on one or more conditions of the wireless communications device;
   setting a threshold response time to the benchmark response time;
   sending, by the authentication system, a message to the wireless communications device, the message comprising the challenge;
   receiving, by the authentication system, a response to the message from the wireless communications device within a response time; and
   authenticating, by the authentication system, the wireless communications device based on the response time being less than the threshold response time,
   wherein the determining the benchmark response time comprises:
      receiving, by the authentication system, processor-load data from the wireless communications device; and
      determining a maximum amount of time for the wireless communications device to respond to the challenge field based on the processor-load data.

7. A method comprising:
   determining, by an authentication system, a benchmark response time for a wireless communications device to respond to a challenge based on one or more conditions of the wireless communications device;
   setting a threshold response time to the benchmark response time;
   sending, by the authentication system, a message to the wireless communications device, the message comprising the challenge;
   receiving, by the authentication system, a response to the message from the wireless communications device within a response time; and
   authenticating, by the authentication system, the wireless communications device based on the response time being less than the threshold response time,
   wherein determining the benchmark response time is based on a series of receptions of challenges and transmissions of responses under varying load conditions of a processor of the wireless communications device.

8. A method comprising:
   determining, by an authentication system, a benchmark response time for a wireless communications device to respond to a challenge based on one or more conditions of the wireless communications device;
   setting a threshold response time to the benchmark response time;
   sending, by the authentication system, a message to the wireless communications device, the message comprising the challenge;

receiving, by the authentication system, a response to the message from the wireless communications device within a response time; and authenticating, by the authentication system, the wireless communications device based on the response time being less than the threshold response time, wherein determining the benchmark response time is based on an amount of interference between the wireless communications device and the vehicle.

9. The method of claim 6, wherein the processor-load data is received by the authentication system when an initial connection is established between the wireless communications device and the authentication system.

10. The method of claim 6, further comprising sending, by the authentication system, a command instructing the wireless communications device to end one or more processes running on the wireless communications device.

11. A system comprising:
a logic device configured to perform operations comprising:
determine a threshold response time for a wireless communications device to process a challenge field;
send the challenge field to the wireless communications device;
receive a response to the challenge field from the wireless communications device within a time; and
authenticate the wireless communications device based on the response time being less than the threshold response time,
wherein the determining the threshold response time comprises:
receiving processor-load data from the wireless communications device; and
determining a maximum amount of time for the wireless communications device to respond to the challenge field based on the processor-load data.

12. The system of claim 11, wherein the determining the threshold response time comprises:
determining a benchmark response time for the wireless communications device to respond to the challenge field based on one or more conditions of the wireless communications device; and
setting the threshold response time to the benchmark response time.

13. A system comprising:
a logic device configured to perform operations comprising:
determine a threshold response time for a wireless communications device to process a challenge field;
send the challenge field to the wireless communications device;
receive a response to the challenge field from the wireless communications device within a time; and
authenticate the wireless communications device based on the response time being less than the threshold response time,
wherein determining the threshold response time comprises:
determining a benchmark response time for the wireless communications device to respond to the challenge field based on one or more conditions of the wireless communications device; and
setting the threshold response time to the benchmark response time, and
wherein the logic device is configured to determine the benchmark response time based on a series of receptions of challenges and transmissions of responses under varying load conditions of a processor of the wireless communications device.

14. A system comprising:
a logic device configured to perform operations comprising:
determine a threshold response time for a wireless communications device to process a challenge field;
send the challenge field to the wireless communications device;
receive a response to the challenge field from the wireless communications device within a time; and
authenticate the wireless communications device based on the response time being less than the threshold response time,
wherein determining the threshold response time comprises:
determining a benchmark response time for the wireless communications device to respond to the challenge field based on one or more conditions of the wireless communications device; and
setting the threshold response time to the benchmark response time, and
wherein the logic device is configured to determine the benchmark response time based on an amount of interference between the wireless communications device and the vehicle.

15. The system of claim 11, wherein the logic device is configured to query the processor-load data when an initial connection is established with the wireless communications device.

16. The system of claim 11, wherein the logic device is further configured to send a command instructing the wireless communications system to end one or more processes running on the wireless communications device.

* * * * *